(12) United States Patent
Naim et al.

(10) Patent No.: US 9,632,994 B2
(45) Date of Patent: *Apr. 25, 2017

(54) GRAPHICAL USER INTERFACE THAT SUPPORTS DOCUMENT ANNOTATION

(75) Inventors: Oscar Gerardo Naim, Redmond, WA (US); Lucretia Henrica Vanderwende, Sammamish, WA (US); Krist Wongsuphasawat, Silver Spring, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1419 days.

This patent is subject to a terminal disclaimer.

(21) Appl. No.: 13/045,531

(22) Filed: Mar. 11, 2011

(65) Prior Publication Data

US 2012/0233558 A1    Sep. 13, 2012

(51) Int. Cl.
*G06F 17/21*    (2006.01)
*G06F 17/24*    (2006.01)
*G06F 17/27*    (2006.01)

(52) U.S. Cl.
CPC ........ *G06F 17/241* (2013.01); *G06F 17/2765* (2013.01)

(58) Field of Classification Search
CPC ..................................................... G06F 17/241
USPC ......................................................... 715/200
See application file for complete search history.

(56) References Cited

U.S. PATENT DOCUMENTS

| | | | |
|---|---|---|---|
| 6,993,475 B1 * | 1/2006 | McConnell et al. | 704/7 |
| 7,512,609 B2 * | 3/2009 | McConnell | |
| 7,555,713 B2 | 6/2009 | Yang | |
| 7,650,330 B1 * | 1/2010 | Brin | 707/999.003 |
| 7,778,982 B2 | 8/2010 | Baker | |
| 7,877,343 B2 * | 1/2011 | Cafarella et al. | 706/20 |
| 8,370,128 B2 * | 2/2013 | Brun et al. | 704/9 |
| 8,533,586 B1 * | 9/2013 | Meyer et al. | 715/230 |
| 2004/0122846 A1 | 6/2004 | Chess et al. | |
| 2004/0243614 A1 | 12/2004 | Boone et al. | |
| 2005/0108001 A1 * | 5/2005 | Aarskog | 704/10 |
| 2007/0150800 A1 | 6/2007 | Betz et al. | |

(Continued)

FOREIGN PATENT DOCUMENTS

WO    WO 2009035871 A1 *    3/2009    ............. G06F 17/27

OTHER PUBLICATIONS

Yangarber, Roman. "Acquisition of domain knowledge." In Information Extraction in the Web Era, pp. 1-28. Springer Berlin Heidelberg, 2003.*

(Continued)

*Primary Examiner* — Frank D Mills
(74) *Attorney, Agent, or Firm* — Medley, Behrens & Lewis, LLC (57) ABSTRACT

A graphical user interface that facilitates annotating documents is described herein. The graphical user interface includes a first field that displays a document to a user. The graphical user interface includes a second field that displays an annotation that has been assigned to a portion of the document, wherein the annotation includes a defined structure. The annotation is in the form of a tuple, wherein the tuple includes a first word or phrase, a second word or phrase, and a third word or phrase that relates the first word or phrase to the second word or phrase. The graphical user interface also includes a third field that facilitates user-editing of annotations.

20 Claims, 6 Drawing Sheets

(56) References Cited

U.S. PATENT DOCUMENTS

| | | |
|---|---|---|
| 2007/0179776 A1 | 8/2007 | Segond et al. |
| 2008/0141111 A1* | 6/2008 | Morris .......................... 715/230 |
| 2008/0201632 A1* | 8/2008 | Hong et al. ................... 715/230 |
| 2008/0201651 A1* | 8/2008 | Hong et al. ................... 715/764 |
| 2009/0070322 A1* | 3/2009 | Salvetti et al. .................. 707/5 |
| 2009/0083026 A1* | 3/2009 | Morsy et al. ..................... 704/9 |
| 2010/0031141 A1 | 2/2010 | Summers et al. |
| 2010/0040227 A1* | 2/2010 | Stephens, Jr. ................... 380/30 |
| 2010/0169299 A1 | 7/2010 | Pollara |
| 2010/0185700 A1* | 7/2010 | Bodain ............. G06F 17/30734 707/803 |
| 2010/0228693 A1* | 9/2010 | Dawson et al. ................ 706/12 |
| 2011/0022941 A1* | 1/2011 | Osborne et al. ............. 715/230 |
| 2011/0137917 A1* | 6/2011 | Boland et al. ................ 707/747 |

OTHER PUBLICATIONS

Joosse, W., "User Trainable Fact", Retrieved at << http://hmi.ewi.utwente.nl/verslagen/afstudeer/JoosseWouterFinalThesis.pdf >>, Jun. 2007, pp. 1-86.

* cited by examiner

GRAPHICAL USER INTERFACE THAT SUPPORTS DOCUMENT ANNOTATION

BACKGROUND

Reviewers of documents often write annotations in the margins of pages that are being read. These annotations can indicate a reviewer's thoughts on a particular passage in a document, can highlight a portion of the document that the reviewer finds important, etc. Thereafter, if the reviewer subsequently reviews the document, the reviewer can quickly locate portions of the document that the reviewer previously found important, and can review annotations in the margins to refresh the memory of the reviewer.

In a particular example, a researcher (one who is researching a particular topic to generate a research paper) can read numerous documents and can annotate several of such documents in connection with generating a new research paper that is germane to the topics that are discussed in the documents being reviewed by the researcher. When composing the resulting research paper, the researcher can review the multiple annotations made to the papers for purposes of citation and analysis.

In another example, students often annotate textbooks or articles in an effort to improve memory regarding a particular topic that is discussed in the textbooks or articles. Thus, when a student attempts to commit a particular topic to memory, the student need not re-read the entire portion of a textbook, but can quickly review the annotations made previously by the student.

It can be ascertained, however, that while a single individual can annotate literary works to add some value to such literary works, these annotations remain solely accessible to the annotator. Therefore, while a second researcher, for instance, may find the annotations of a first researcher to be quite useful with respect to a particular topic, the second researcher will be unable to easily obtain these annotations even if the first researcher wished to share them. This is because conventionally the annotations are made in the margins of paper documents, which are not easily shareable amongst several people.

Some word processing applications have been implemented with functionality that allows users of such applications to provide or enter comments corresponding to particular portions of text being displayed by way of the word processing application. Enabling researchers to annotate documents in the word processing application allows for sharing of annotations to be done somewhat more readily, as a word processing document can be e-mailed between researchers and word processing documents can be readily duplicated. Effectively sharing annotations using conventional word processing applications, however, requires that the first researcher and second researcher are familiar with one another, and further require that the first researcher has knowledge that the second researcher would like to receive or study the annotations made by the first researcher.

SUMMARY

The following is a brief summary of subject matter that is described in greater detail herein. This summary is not intended to be limiting as to the scope of the claims.

Various technologies pertaining to annotating contents of a document by way of a graphical user interface are described herein. An application can be employed to view documents, wherein the application can be a word processing application, an Internet browser, or other suitable application that can be utilized to display documents to users. The graphical user interface can include a first field that displays text and/or images of a document to a user. Pursuant to an example, one or more extractor modules can be employed to automatically generate annotations for certain portions of the document. For instance, an extractor module can be configured to search for a particular word or phrase in the document. Once the extractor module locates such word or phrase, the extractor module can utilize natural language processing techniques to identify semantic features of the sentence that includes the identified word or phrase. Based at least in part upon these identified semantic features, the extractor module can cause an annotation to be automatically generated, wherein the annotation is structured in accordance with the identified semantic features in the form of a tuple.

In an example, a tuple can comprise certain semantic structures, such that the tuple has a particular format, and the format can be consistent for every annotation that can be applied to a document through utilization of the application. For instance, the tuple can comprise the following semantic structures: a subject, an object, and a predicate that relates the subject to the object. If an extractor module is utilized to automatically generate an annotation in the form of a tuple, natural language processing techniques can be utilized by the extractor module to locate a subject of a sentence in the document, an object of the sentence in the document, and a predicate of the sentence in the document.

Pursuant to an example, a portion of the document displayed in the first field that has an annotation assigned thereto can be highlighted, thereby providing the user with a visual indication that the highlighted portion has been assigned an annotation. As used herein, the portion of the document can be a sentence, a paragraph, a page, etc. Additionally, the graphical user interface can include a second field that displays an annotation that was assigned to such portion of the document. The annotation can be displayed in a manner that indicates the different elements of the tuple (e.g., subject, predicate, object).

The graphical user interface may also comprise a third field that provides the user with an ability to modify an automatically generated annotation. Further, the third field can provide the user with the ability to assign a new annotation to a portion of the document. For example, the user can select a particular portion of the document displayed in the first field through utilization of a cursor, touch, gesture, voice command, or the like. Responsive to such portion of the document being selected, an annotation in the form of a tuple can be provided to the user in the third field, wherein the annotation can comprise several options that were identified, for instance, by an extractor module. In other words, for a particular sentence in the document, the extractor module may locate several possible subjects of the sentence, several possible objects of the sentence (e.g., different object phrases), etc. Thus, the third field can display a plurality of selectable options for each element of the tuple. Additionally or alternatively, the graphical user interface can include a plurality of text entry fields that facilitate manual creation of annotations, wherein the annotations are in the form of the tuple described above. Thus, for instance, three separate text entry fields can be presented to the user, wherein each text entry field corresponds to a particular portion of the tuple (e.g., subject, object, or predicate).

Subsequent to the user approving one or more annotations to the document, the user can select a graphical button in the graphical user interface that causes the annotations and corresponding relationship data to be transmitted to a data repository that is accessible to others, for instance, by way of an Internet browser. Such annotations can be aggregated with other annotations of the same format (other annotations structured as a tuple). Accordingly, the data repository can retain a plurality of annotations that have a substantially similar format, such that these annotations are in a form that can be readily searched or processed by way of a processor. As mentioned above, relationship data can also be transmitted to the searchable data repository together with such annotations. The relationship data can include an identity of the document to which the annotation was assigned, an identity of the author of the document to which the annotation was assigned, an identity of the annotator, amongst other data that relates the annotation to the document or attributes of the document.

Other aspects will be appreciated upon reading and understanding the attached figures and description.

DETAILED DESCRIPTION

Various technologies pertaining to assigning annotations to documents by way of a graphical user interface will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
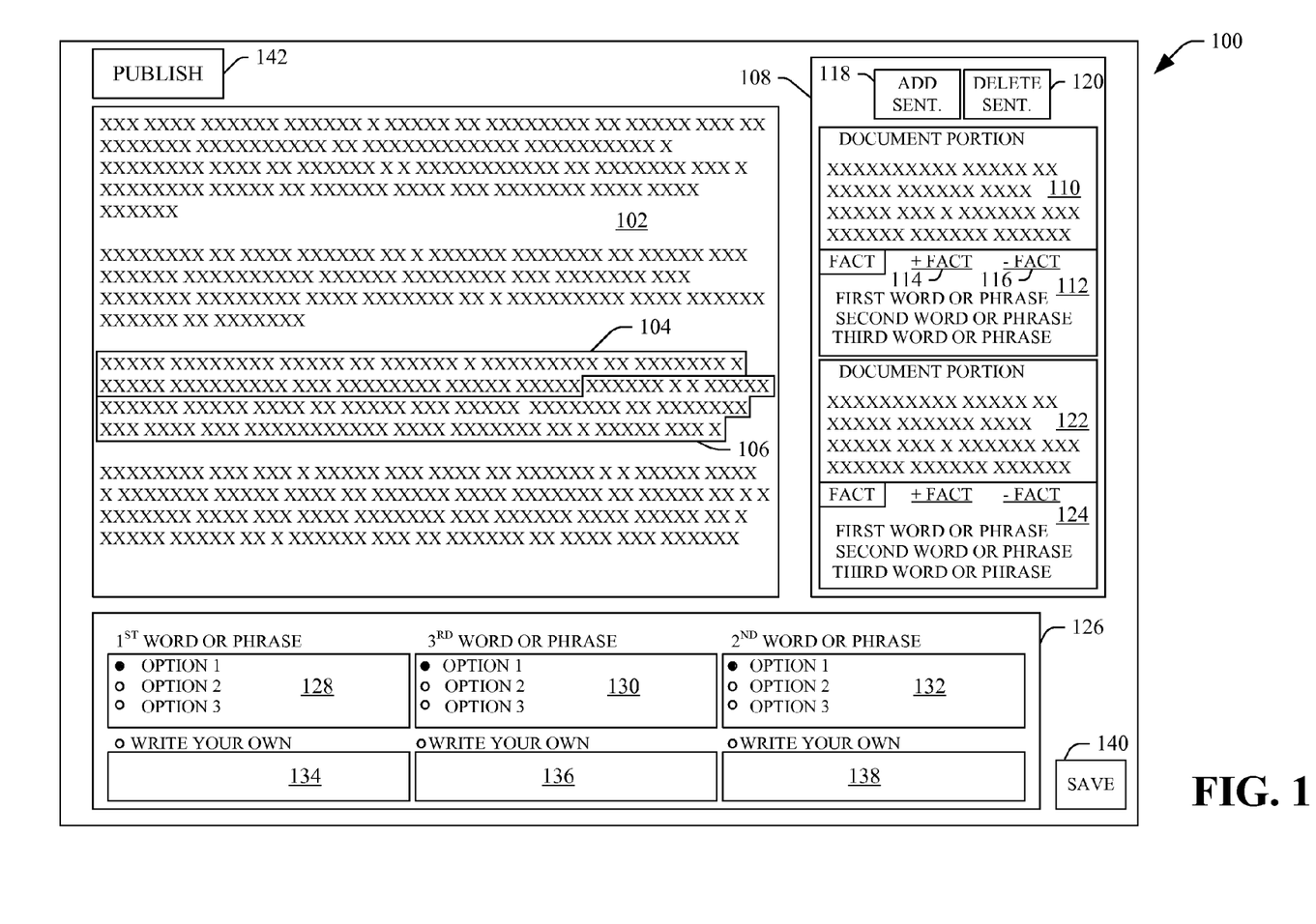
FIG. 1 is an exemplary graphical user interface.

With reference now to FIG. 1, an exemplary graphical user interface 100 corresponding to an application that can be utilized to view documents and assign annotations to documents is illustrated. Pursuant to an example, the application that corresponds to the graphical user interface 100 can be a word processing application, an Internet browser or other suitable application that can be utilized to view and assign annotations to documents. Accordingly, the document can be a word processing document, a web page (or other document that is generated by way of a markup language), etc. The graphical user interface 100 comprises a first field 102 that is configured to display a document on a display screen of a computing device. As shown, the document displayed in the first field 102 comprises a plurality of different portions of text. It is to be understood, however, that the document shown in the first field 102 can comprise images, links to videos etc. The portions of text of the document can be sentences, paragraphs etc.

In the exemplary graphical user interface 100, the user has selected a first portion 104 of the document being displayed in the first field 102, wherein, for instance, the user has selected the first portion 104 of the document through utilization of a cursor, a gesture, a voice command, a touch, etc. Upon selecting the first portion 104 of the document in the first field 102, the first portion 104 can be highlighted in the document to differentiate it from other portions of the document displayed in the first field 102. In an example, the first portion 104 can be a sentence, and the sentence can be highlighted upon the user placing the cursor anywhere in the sentence in the first field 102. A second portion 106 of the document displayed in the first field 102 can also be highlighted to differentiate such portion 106 from the first portion 104 and other portions of the document. For instance, the first portion 104 and the second portion 106 can be highlighted in different colors, can be displayed in different fonts, can be displayed in different text sizes, etc. In the example shown in the graphical user interface 100, a second portion 106 can be highlighted for being adjacent to the first portion 104.

Further, highlighting of the first portion 104 and the second portion 106 in the first field 102 can indicate that the first portion 104 and the second portion 106 have annotations of a particular format assigned thereto. For instance, the annotations can be in the form of a tuple, wherein the tuple comprises particular semantic structures. With more specificity, the tuple can include a first word or phrase, a second word or phrase, and a third word or phrase that relates the first word or phrase to the second word or phrase. In an example, the first word or phrase can be a subject, the second word or phrase can be an object, and the third word or phrase can be a predicate that relates the subject to the object of the sentence.

Responsive to a user selecting the first portion 104 and/or the second portion 106 of the document displayed in the first field 102, a second field 108 in the graphical user interface 100 can be populated with the portions 104 and/or 106 and/or annotations assigned thereto. The second field 108 can graphically display the portions 104 and 106 of the document displayed in the first field 102 that are highlighted, as well as annotations of the aforementioned format that have been assigned to the portions 104 and 106. Annotations that are in the form of the tuple described above can be referred to herein as "facts". Therefore, for instance, responsive to the user selecting the first portion 104 in the document displayed in the first field 102, the first portion 104 can be displayed in a first window 110 of the second field 108. Additionally, the second field 108 may comprise a second window 112 that displays a fact that has been assigned to the first portion 104.

Pursuant to an example, the fact displayed in the second window 112 can be automatically generated by way of an extractor module. An extractor module is a computer-executable program that is configured to automatically search through the document for a particular word or phrase, for a particular semantic structure (such as a document citation) that is included in the document, for a particular sentence structure, etc. Therefore, the extractor module can utilize natural language processing technology, such that the extractor module can automatically identify certain semantic features of portions of the document displayed in the first field 102. The extractor module may then be configured to extract a tuple of the form described above, and assign such tuple (fact) to the first portion 104 of the document selected by the user. If the first portion 104 of the document that was selected by the user in the first field 102 does not have a fact assigned thereto, then the second window 112 in the second field 108 can be empty.

The second window 112 can comprise a first button or hyperlink 114 and a second button or hyperlink 116. The first button or hyperlink 114 can cause a fact to be added to the first portion 104 of the document displayed in the first window 110 of the second field 108. For instance, selection of the first button or hyperlink 114 can cause an extractor module to execute over the first portion 104 of the document shown in the first window 110 of the second field 108 and automatically assign a fact to the first portion 104 of the document. Alternatively, selection of the first button or hyperlink 114 can cause the fact displayed in the second window 112 to be assigned to the first portion 104 displayed in the first window 110 of the second field 108. In another example, if a fact was previously assigned to the first portion 104 of the document, then such fact can be presented in the second window 112 of the second field 108 responsive to the user selecting the first portion 104 of the document in the first field 102. The user can review the fact shown in the second window 112 and, if the user chooses to refrain from assigning the fact shown in the second window 112 to the first portion 104, then the user can select the second button or hyperlink 116, which causes the fact to be deleted and disassociated with the first portion 104 of the document.

The second field 108 can further comprise a pair of buttons 118 and 120, wherein the user selection of the button 118 can cause an annotation to be added to the document, while depression of the button 120 can cause an annotation to be deleted from the document. In an example, an extractor module may not automatically generate a fact for a portion of the document that is of interest to the user. Thus, the user can manually generate an annotation and cause such annotation to be assigned to the document through depression of the button 118. Similarly, the user can cause an annotation to be removed through depression of the button 120.

The second field 108 may further comprise a third window 122 and a fourth window 124, which are configured to display, for instance, the second portion 106 of the document shown in the first field 102 and any facts that are assigned thereto. Thus, as shown, the second field 108 can include sufficient display screen real estate to depict a plurality of sentences shown in the first field 102 and associated facts. It is be understood, however, that in some embodiments it may be beneficial to show a single portion (sentence) in the second field 108 and facts corresponding to such single portion rather than using screen real estate to show multiple portions of the document.

The graphical user interface 100 can further comprise a third field 126 that includes tools that allow the user to modify facts that were automatically generated by an extractor module. Additionally, the third field 126 includes tools that allow the user to manually assign a fact to a portion of the document shown in the first field 102. In an example, the third field 126 can comprise a fifth window 128, a sixth window 130, and a seventh window 132. The fifth window 128 can be configured to display a plurality of options located by an extractor module that correspond to a first semantic structure in a tuple (fact), which can be a first word or phrase (a subject). For instance, the fifth window 128 can display a plurality of possible subjects of the first portion 104 of the document as located by the extractor module. The sixth window 130 can display another plurality of options found by the extractor module for a second semantic structure in the tuple, which can be a third word or phrase (a predicate or verb that relates the subject to an object). Similarly, the seventh window 132 can comprise a plurality of options located by the extractor module for a third semantic structure in the tuple (an object that is related to the subject by way of the predicate). Each of the options shown in the fifth window 128, the sixth window 130, and the seventh window 132 can have a radio button or check box corresponding thereto, such that the user can select one of the options shown in each of the fifth window 128, the sixth window 130, and the seventh window 132. It can be ascertained that through this approach the format of the tuple is maintained for all facts assigned a portion of the document shown in the first field 102.

The third field 126 can also comprise a first text entry field 134, a second text entry field 136, and a third text entry field 138. Such fields can also be referred to as editing fields. These text entry fields 134-138 are configured to receive user-generated facts or portions of facts (portions of the tuple). For instance, the user may wish to assign a fact to a sentence in the document, wherein the extractor module was imperfect in locating options for the fact or was not configured to generate a fact for the sentence. The user can utilize one or more of the text entry fields 134-138 to enter her own fact or portion of a fact or alter an automatically generated fact or portion of a fact. For instance, if the user does not see a desirable option for the second word or phrase shown in the seventh window 132, the user can select a radio button, check box, etc corresponding to the first text entry field 134 and can enter her own text in such text entry field 134. Similarly, for instance, if the sixth window 130 does not include a predicate that is desired to be associated with a portion of the document selected by the user, then the user can select a radio button, check box, etc. corresponding to the second text entry field 136 and can manually enter a desired predicate. Likewise, the user can enter text into the first text entry field 138 to assign a customized subject to the portion 104 of the document.

The graphical user interface 100 can further comprises a save button 140, wherein depression of the save button 140 causes a fact modified by way of the third field 126 to be assigned to the portion of text selected by the user and highlighted in the first field 102. The graphical user interface 100 further comprises publish graphical button 142 that, when selected by the user, causes at least one data packet to be generated and transmitted to a data repository that is accessible to others by way of a network connection. The data packet generated by the application includes at least one fact and corresponding relationship data. The relationship data relates the fact to the document and/or attributes of the document, such as the author of the document, the date of creation of the document, the type of document, etc. Additionally, the relationship data can relate the fact to the particular portion of the document to which the fact has been assigned. Moreover, the relationship data can relate the fact to the annotator. The fact and relationship data can be included in a data packet that is transmitted from the computing device that includes the application that corresponds to the graphical user interface 100 to a cloud data repository, for instance. In another example, however, the application itself may be an application that is configured to execute on a server that can be accessed from a client computing device by way of an Internet browser, such that the data packet need not be transmitted to another computing device.

Furthermore, while the graphical user interface 100 has been shown as having a particular configuration, it is be understood that other configurations are contemplated by the inventors and are intended to fall under the scope of the hereto-appended claims. Specifically, any configuration that allows a user to view a document, select a portion of such document and assign a fact of the structure described above to such document is intended to fall under the scope of the hereto-appended claims, as the structure of the graphical user interface 100 is exemplary in nature is not intended to limit the claims.

Figure 2:
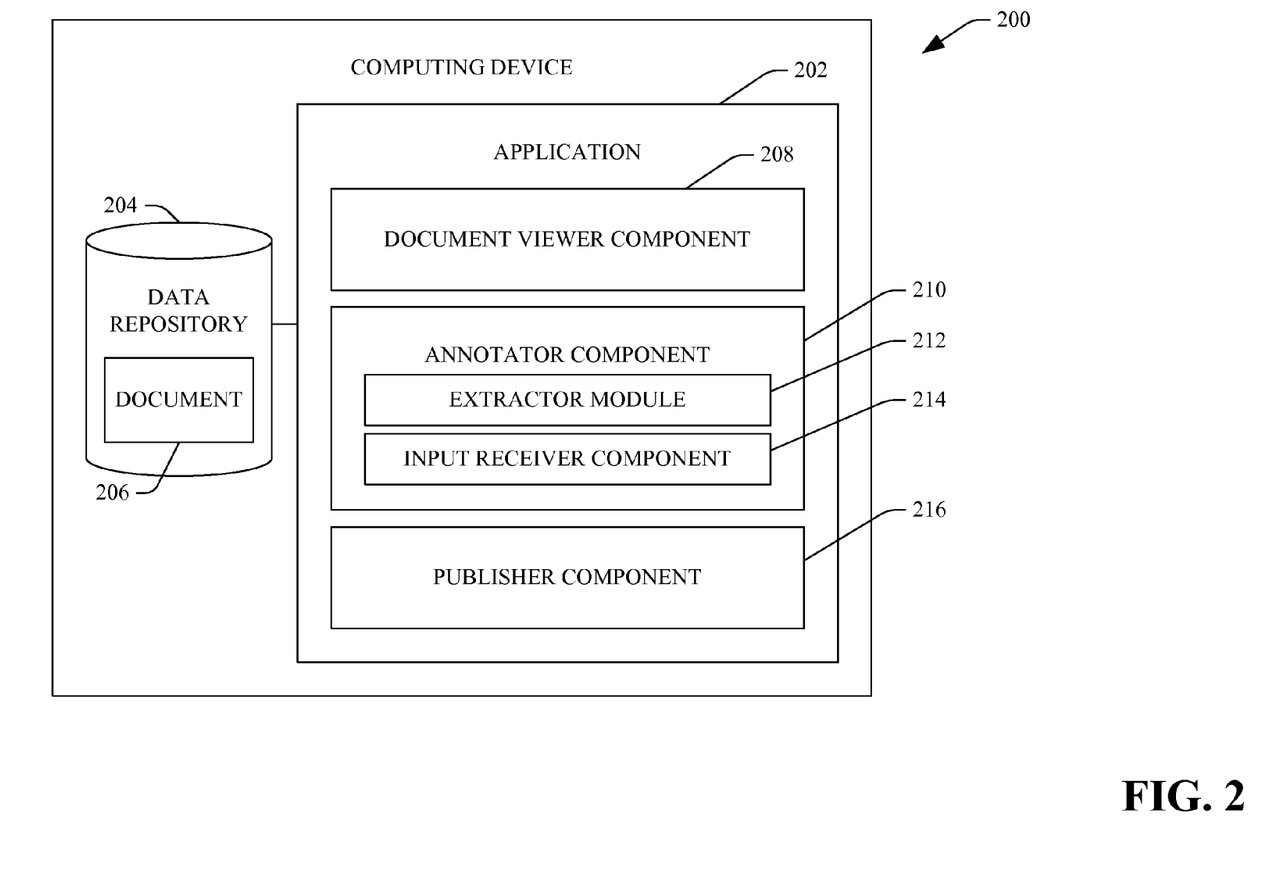
FIG. 2 is a functional block diagram of an exemplary computing device that can be utilized in connection with providing annotations to documents.

Referring now to FIG. 2, an exemplary computing device 200 that can include the application that corresponds to the graphical user interface 100 is illustrated. The computing device 200 comprises an application 202 that corresponds to the graphical user interface 100. Therefore, the application 202 can be a word processing application, an Internet browser, or other suitable application that is configured to display documents to users. The computing device 200 further comprises a data repository 204, wherein the data repository 204 can be a hard drive, memory allocated to the application 202, or the like. The data repository 204 comprises at least one document 206 that is selected by the user to view through utilization of the application 202. The user of the application 202 can select a document 206 for viewing by way of the graphical user interface 100, for example.

The application 202 comprises a document viewer component 208 that facilitates displaying text or images in the document 206 to the user. That is, the document viewer component 208 can receive the document 206 and display text or images in human-readable format on the display of the computing device 200, thereby allowing the user of the computing device 200 to review the document 206 that is being displayed by the application 202.

The application 202 executing on the computing device 200 further comprises an annotator component 210 that is configured to assign annotations (facts) to portions of the document 206 being displayed by the document viewer component 208 to the user, wherein such facts have been approved by the user through utilization of the graphical user interface 100. Pursuant to an example, the annotator component 210 can comprise at least one extractor module 212 that is configured to extract text from the document 206 being reviewed by the user. For instance, the extractor module 212 can be configured to search text of the document 206 for a particular word or sentence structure. In a particular example, it may be desirable to assign a fact to each sentence that includes a citation to a different document. In such case, the extractor module 212 can locate sentences that have citations to other documents therein and can automatically generate facts as described above. Once the extractor module 212 locates sentences of the aforementioned type, the extractor module 212 can be configured to analyze that sentence for certain semantic features. That is, the extractor module 212 can be configured to extract a tuple from the sentence wherein, for example, the tuple comprises a subject, predicate, object, triple.

The annotator component 210 can also comprise an input receiver component 214 that is configured to receive user input with respect to a fact generated by the extractor module 212, to receive modifications to a fact, or a manually generated fact that comprises the tuple. For example, an automatically generated fact by the extractor module 212 can be provided to the document viewer component 208, which can present the fact to the user. The user may wish to modify the fact to add or change particular words or phrases in the fact, or to remove words or phrases from the fact. The input receiver component 214 can receive this user input and the fact can be modified pursuant to input of the user. In another example, the user may wish to provide a fact that was not automatically generated by the extractor module 212. In such a case, for instance, the user can select a particular sentence being displayed to the user by the document viewer component 208 and can manually generate a fact that corresponds to that sentence. Again, this manual annotation can comprise the tuple that has been described above, wherein the different sentence parts (subject, object, predicate) are defined.

Once the user has completed annotating the document 206, the user may wish to cause such fact to be shared with others. To that end, the application 202 can further comprise a publisher component 216 that can publish facts to a data store that is accessible to others by way of a network connection. For instance, the publisher component 216 can cause facts to be published in the data store responsive to the user depressing the graphical button 142 in the graphical user interface 100 (FIG. 1). With more specificity, the publisher component 216 can generate a data packet such as the data packet described above. Thus, the publisher component 216 can cause a fact generated by way of the annotator component 210 to be included in the data packet and can also cause relationship data to be included in such data packet. Once the data packet has been generated, the publisher component 216 can cause the data packet to be transmitted to a particular location by way of the network connection. In an example, the publisher component 216 can have knowledge of an IP address of a computing device where facts from multiple users across multiple documents are retained. Upon the user of the computing device 200 indicates that she wishes the facts to be published, the publisher component 216 can generate the aforementioned data packet and can cause the data packet to be transmitted to a computing device that is assigned the IP address known by the publisher component 216. Other mechanisms for causing data packets as described herein to be retained in a data repository that is accessible to others by way of a network connection are contemplated by the inventors and intended to fall under the scope of the hereto-appended claims.

Figure 3:
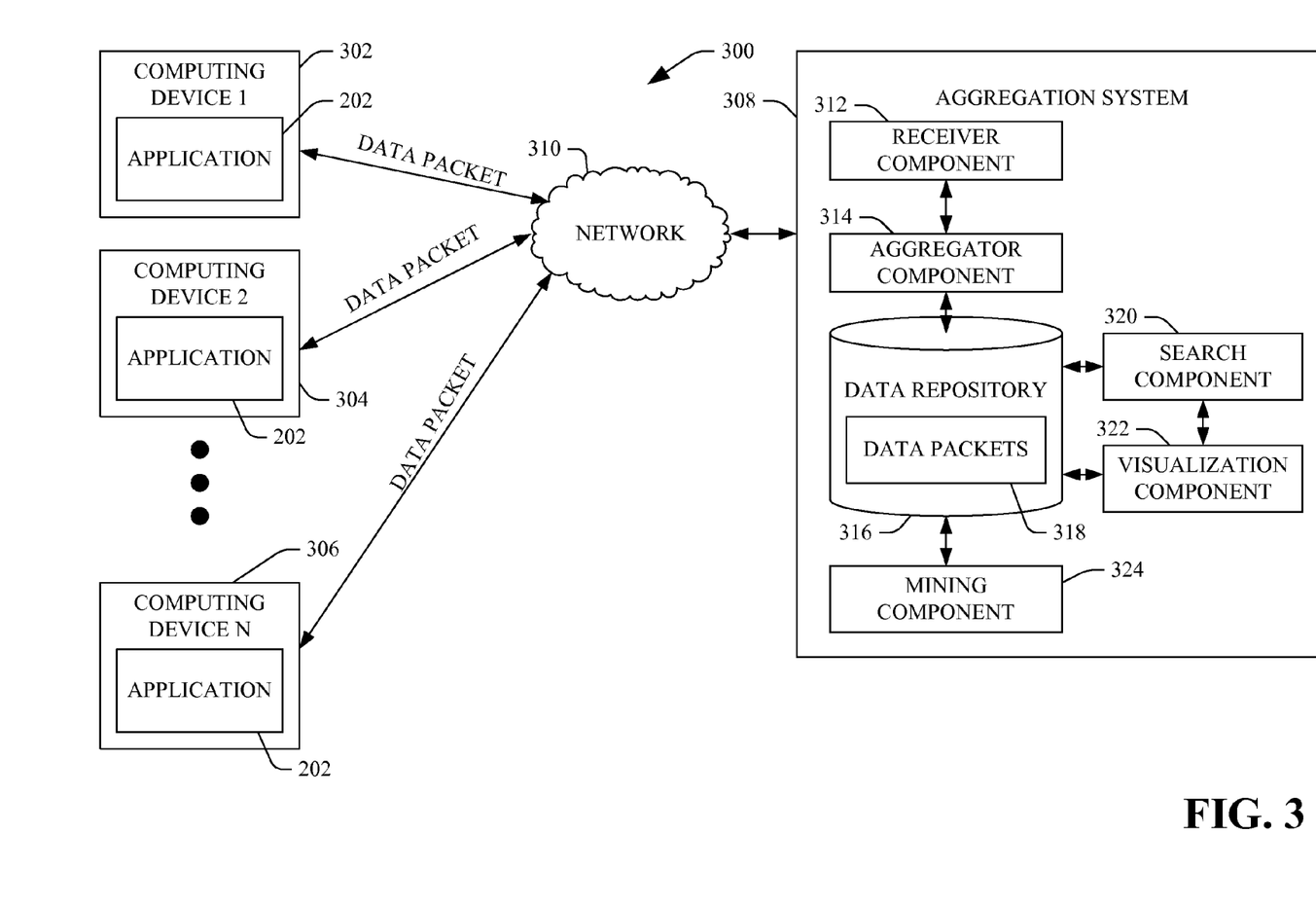
FIG. 3 is a functional block diagram of an exemplary system that facilitates aggregating annotations made to documents by a plurality of users to a plurality of different documents.

Turning now to FIG. 3, an exemplary system 300 that facilitates aggregating facts made to documents by multiple users of different computer devices by way of the graphical user interface 100 is illustrated. The system 300 includes a plurality of computing devices 302-306. Specifically, the plurality of computing devices 302-306 comprises a first computing device 302, a second computing device 304, and an nth computing device 306. Each of the computing devices 302-306 has the application 202 (FIG. 2) executing thereon. As described previously, the application 202 can be configured to allow a user to review documents and assign facts to documents.

Pursuant to an example, a user of the first computing device 302 can initiate the application 202 such that the application 202 is executing on the first computing device 302. The user may cause the application 202 to display a particular document that is desirably reviewed by the user of the first computing device 302. When reviewing such document, the user can generate or review and approve facts that pertain to such document. Thereafter, the user may wish to publish these facts such that the facts can be reviewed by others who may also be interested in the document, interested in a particular research field that pertains to the document, etc. Therefore, through utilization of the application 202, the user of the first computing device 302 can choose to publish the facts made to the document that was reviewed through utilization of the application 202. For example, the user can indicate that she wishes to publish the facts by selection of the graphical button 142 on the graphical user interface 100.

Upon receiving a command to publish the facts in the document, the application 202 can generate a data packet. As discussed previously, this data packet can include a fact which comprises the tuple of a first word or phrase, a second word or phrase, and a third word or phrase that relates the first and second words or phrases. The data packet generated by the application 202 can also include relationship data, wherein the relationship data can identify relationships between the fact included in the data packet and attributes of the document to which the fact is assigned. For instance, the relationship data can comprise first data that indicates the identity of the document to which the fact has been assigned. The relationship data can also comprise second data that identifies a portion of such document to which the fact was assigned. Still further, the relationship data can comprise third data that identifies an author of the document. Moreover, the relationship data can comprise fourth data that identifies an author/approver of the fact. It is to be understood that multiple reviewers of various different documents can use the application 202 to review and assigned facts to such documents, and may then choose to publish these facts so the facts can be aggregated and utilized for review/analysis.

The system 300 further comprises an aggregation system 308 that is configured to aggregate data packets transmitted from the computing devices 302-306. For instance, the aggregation system 308 may be in communication with the computing devices 302-306 by way of a suitable network 310. Pursuant to an example, the network 310 can be the Internet. In another example, the network 310 may be a cellular network, an intranet or other suitable network such as a LAN, a wireless area network, etc. Responsive to, for instance, the user of the first computing device 302 choosing to publish facts corresponding to a document being reviewed by way of the application 202, at least one data packet is transmitted from the first computing device 302 to the aggregation system 308 by way of the network 310. Furthermore, it is to be understood that each of the computing devices 302-306 may transmit multiple data packets to the aggregation system 308 by way of the network 310.

The aggregation system 308 can comprise a plurality of components that are executable by a processor. Therefore, the aggregation system 308 may be included in, for instance, a server system that comprises at least one processor and corresponding memory, wherein components in the memory are accessible and executable by the processor. The plurality of components comprise a receiver component 312 that receives a data packet transmitted by way of the application 202 executing on the first computing device 302. As described above, the data packet has a first format that includes a fact and corresponding relationship data. The fact has been assigned to a portion of a document being reviewed by the user by way of the application 202, and the fact comprises the aforementioned tuple. Further, the relationship data in some way relates to the fact with a document to which the fact was assigned.

The aggregation system 308 further comprises an aggregator component 314 that is in communication with the receiver component 312, wherein the aggregator component 314 is configured to aggregate a data packet received by the receiver component 312 with other data packets of the same format in a data repository 316. In other words, each fact comprises a tuple that includes, for instance, a subject, predicate, object triple. The aggregator component 314 can cause a plurality of different data packets that were received from a plurality of different computing devices with respect to a plurality of different documents that were assigned a plurality of different facts to be retained in the data repository 316 as data packets 318. The aggregator component 314, for instance, can be configured to aggregate the data packets 318 in the data repository 316 in some suitable database format such that the data packets 318 are readily processable by a computer processor. This aggregation of multiple facts pertaining to multiple different documents by different annotators creates a network of knowledge that was heretofore unavailable. In other words, the data packets 318 can be aggregated in the data repository 316 by the aggregator component 314 in a format suitable for a processor to perform at least one processing function over at least one of the data packets in the data packets 318.

For instance, the aggregation system 308 may optionally include a search component 320 that can receive a query by way of the network 310 and execute a search over the data packets 318 in the data repository 316 based at least in part upon the query. For example, the query received by the search component 320 can include a word or phrase. The search component 320 can then be configured to search for facts in the data packets 318 that comprise the word or phrase. The search component 320 may also be configured to output search results to the user responsive to execution of the search over the data packets 318, wherein the search results can include facts that comprise the word or phrase in the query (or related words or phrases) as well as relationship data corresponding to such facts. In another example, the search component 320 can receive the name of an author as a query and the search component 320 can retrieve annotations or facts in the data packets 318 that were authored by the author or were assigned to documents that were offered by such author.

The aggregation system 308 may further optionally comprise a visualization component 322 that can visualize facts and relationships in the data packets 318. Pursuant to an example, the visualization component 322 can be in communication with the search component 320 and can visualize relationships between facts and corresponding documents/authors/other annotations retrieved by the search component 320.

The aggregation system 308 may further optionally include a mining component 324 that performs a data mining function over the data packets 318 in the data repository 316. For instance, the mining component 324 may be configured to search for patterns in the data packets 318 retained in the data repository 316 such that, for example, identities of authors that comment on a particular topic frequently can be ascertained, identities of authors that are frequently co-cited can be ascertained, etc. Relationships or patterns located by the mining component 324 can be output or can influence searches undertaken by the search component 320.

Figure 4:
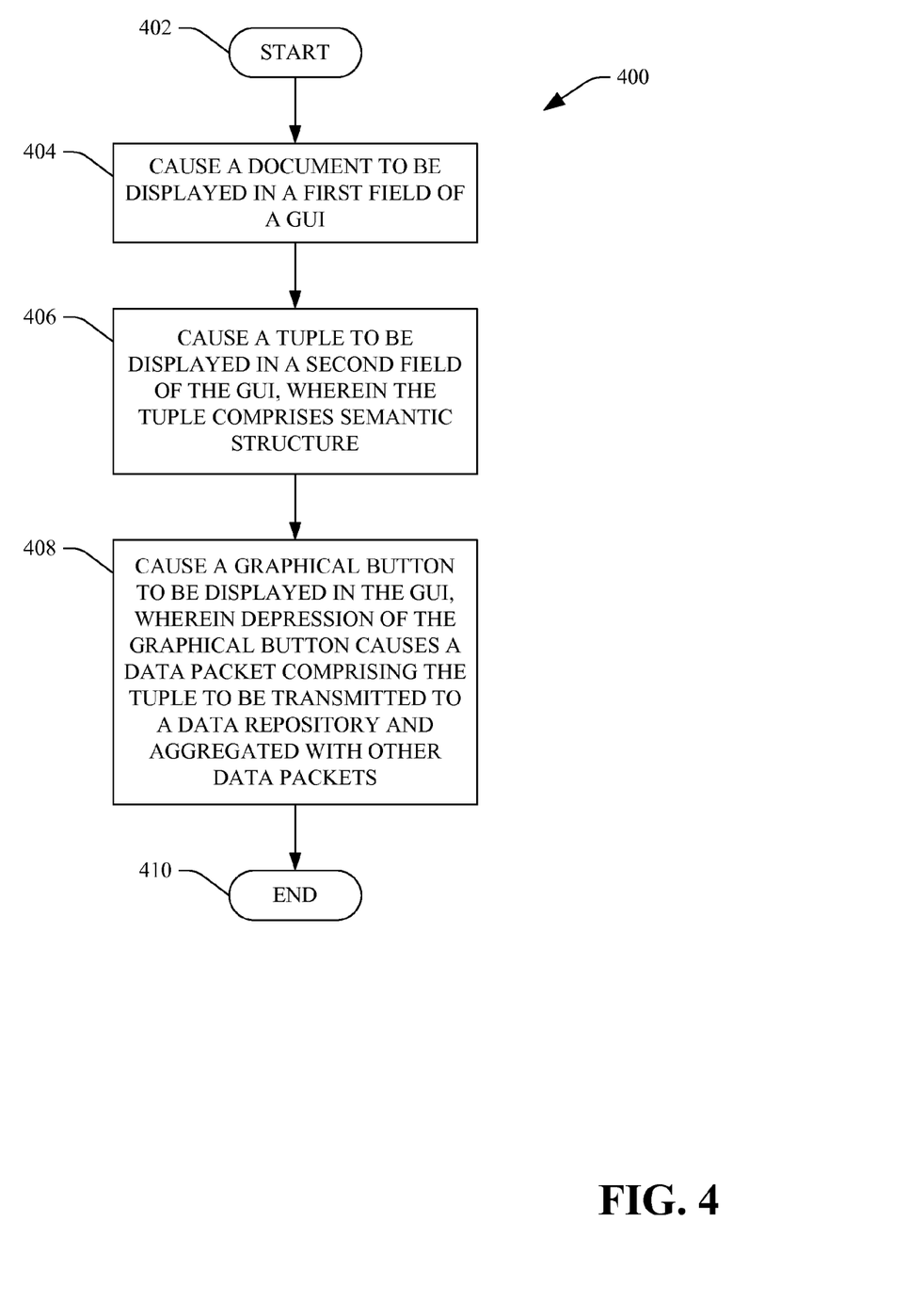
FIG. 4 is a flow diagram that illustrates an exemplary methodology for presenting a graphical user interface of an application to a user, wherein the graphical user interface facilitates annotating documents displayed via the application.
Figure 5:
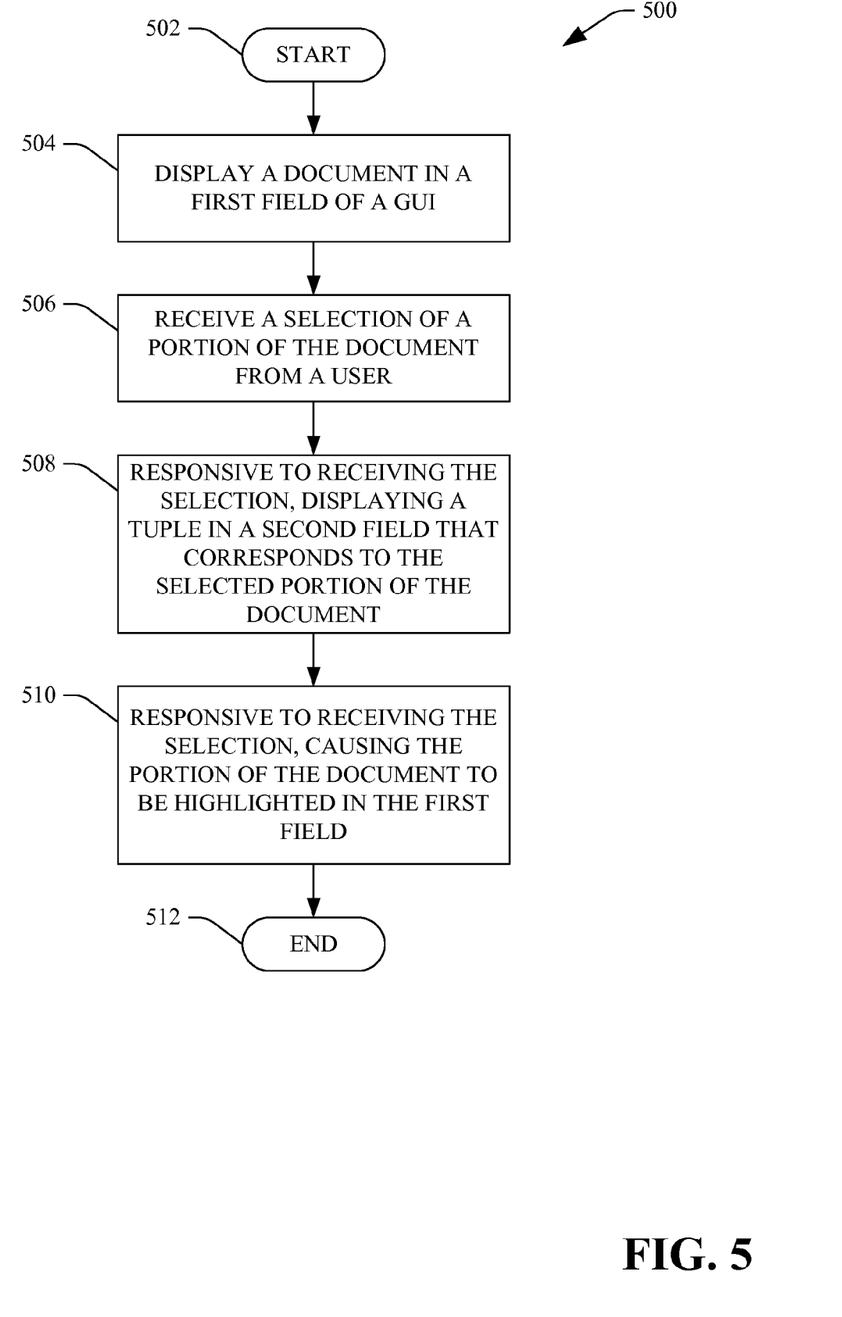
FIG. 5 is a flow diagram that illustrates an exemplary methodology for displaying a document and annotations related thereto to a user.

With reference now to FIGS. 4-5, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like. Additionally, the methodologies described herein can be configured for execution on a variety of computing devices, including desktop computing devices, servers, laptop computing devices, mobile computing devices such as mobile telephones, etc.

With reference now to FIG. 4, a methodology 400 that facilitates causing a graphical user interface of an application to be displayed to a user, wherein the graphical user interface is configured to receive annotations to documents, is illustrated. The methodology 400 starts at 402, and at 404 a document is caused to be displayed in a first field of a graphical user interface on a display screen of a computing device. The graphical user interface can correspond to a particular application, wherein the application can be a word processing application, an Internet browser, or other suitable application.

At 406, a tuple is caused to be displayed in a second field of the graphical user interface. The tuple is assigned to a portion of the document that is displayed in the first field of the graphical user interface, and the tuple comprises a first word or phrase, a second word or phrase, and a third word or phrase that relates the first word or phrase to the second word or phrase. Graphically, this can be visualized as two nodes and an edge. The first word or phrase and the second word or phrase are nodes, and the third word or phrase is an edge that relates the first node to the second node. In an example, the first word or phrase can be a subject of a sentence, the second word or phrase can be an object of the sentence, and the third word or phrase can be a predicate of the sentence.

At 408, a graphical button is caused to be displayed in the graphical user interface in a third field. Depression of the graphical button can cause the application to generate a data packet and transmit such data packet to a data repository by way of a network connection. The data packet can include the tuple and relationship data that relates the tuple to the document and/or attributes of the document such as the author of the document, annotator of the document, etc. The data repository to which the data packet is transmitted comprises other data packets of the same format. That is, other data packets include tuples that define different portions of a sentence, for example (subject, predicate, object). The methodology 400 completes at 410.

Referring now to FIG. 5, an exemplary methodology 500 that facilitates providing a graphical user interface to a user, wherein the graphical user interface facilitates review and annotation of documents, is illustrated. The methodology 500 starts at 502, and at 504 a document is displayed in a first field of a graphical user interface corresponding to an application, wherein the document comprises text.

At 506, a selection of a portion of a document is received from a user. For instance, the user can select a portion of the document through utilization of a cursor.

At 508, responsive to receiving a selection of the portion of the document from the user in the first field, a tuple is displayed in a second field of the graphical user interface that corresponds to the portion of a document being displayed in the first field that has been selected by the user. Specifically, the tuple is a fact that has been assigned to the portion of the document being displayed in the first field, and the tuple comprises the following parts of a sentence: a subject of the sentence, an object of the sentence, and a predicate that relates the subject to the object.

At 510, responsive to receiving a selection of the portion of the document from the user in the first field, the portion of a document is highlighted in the first field to visually distinguish the portion of a document selected by the user with other portions of the document. Thus, the portion of the document is highlighted simultaneously with an annotation corresponding to the portion of a document being presented to the user. The user may then choose to publish the annotation as described above such that the annotation can be aggregated with other annotations assigned to other documents by other users, thereby creating a network of knowledge that was heretofore unavailable. The methodology 500 completes at 512.

Figure 6:
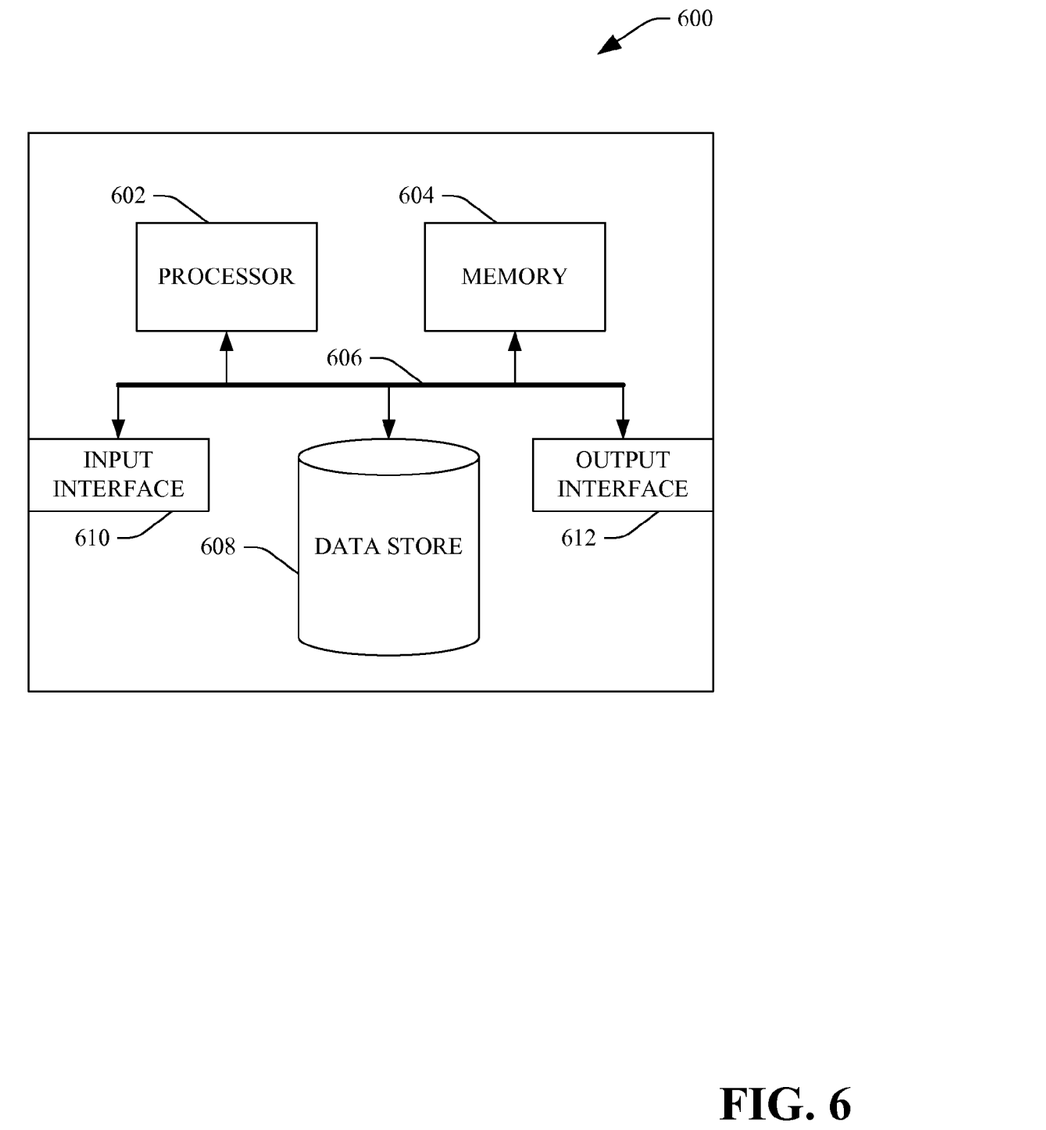
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports displaying the graphical user interface 100 to a user. In another example, at least a portion of the computing device 600 may be used in a system that supports aggregating facts generated by way of an application that corresponds to the graphical user interface 100. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store graphical buttons, facts, documents, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, facts, documents, document attributes, etc. The computing device 600 also includes an input interface 610 that allows external devices to communicate with the computing device 600. For instance, the input interface 610 may be used to receive instructions from an external computer device, a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component", "system", and "module" are intended to encompass hardware, software, or a combination of hardware and software. Thus, for example, a component, system, or module may be a process, a process executing on a processor, or a processor. Additionally, a component, system, or module may be localized on a single device or distributed across several devices. Furthermore, a component, system, or module may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computing device comprising:
    a processor; and
    memory that comprises a computer-executable application that, when executed by the processor, causes the processor to display a graphical user interface on a display that is in communication with the processor, the graphical user interface comprises:
        a first field that displays at least a portion of a document on the display, the document comprises text;
        a second field that displays a tuple that has been assigned to the portion of the document displayed in the first field, the tuple comprises a first word or phrase, a second word or phrase, and a third word or phrase that relates the first word or phrase to the second word or phrase;
        a third field that comprises a first text entry field, a second text entry field, and a third text entry field, the first text entry field is configured to receive a user-defined replacement of the first word or phrase, the second text entry field is configured to receive a user-defined replacement of the second word or phrase, and the third text entry field is configured to receive a user-defined replacement of the third word or phrase; and
        a graphical button that, when selected, causes a data packet to be generated and transmitted to a data repository that is in network communication with the computing device, the data repository comprises a database that includes tuples having a same format as the tuple, the tuples being annotations to other documents, the data packet comprises the tuple and relationship data, the relationship data indicates that the tuple is an annotation to the portion of the document.

2. The computing device of claim 1, the computer-executable application is one of a word processing application or a web browser.

3. The computing device of claim 1, the document is composed in a markup language.

4. The computing device of claim 1, the portion of the document is a sentence, the first word or phrase is a subject of the sentence, the second word or phrase is an object of the sentence, and the third word or phrase is a predicate of the sentence that relates the subject of the sentence to the object of the sentence.

5. The computing device of claim 1, the processor further configured to highlight the portion of the document in the first field to visually differentiate the portion of the document with other portions of the document.

6. The computing device of claim 1, the processor further configured to execute an extractor module, the extractor module automatically generates the tuple in the second field.

7. The computing device of claim 1, the tuple is manually generated by the user.

8. The computing device of claim 1, the graphical user interface further comprises a second graphical button that, when selected, causes the tuple to be deleted such that the tuple is no longer assigned as the annotation to the portion of the document.

9. The computing device of claim 1, the third field further comprises:
    a window that is configured to display a selectable option for one of the first word or phrase, the second word or phrase, or the third word or phrase, the processor configured to assign the selectable option to the tuple responsive to receipt of a selection of the selectable option.

10. The computing device of claim 1, the graphical user interface further comprises a second button, wherein the processor, responsive to the second button being selected, causes the tuple to be assigned to the portion of the document as the annotation.

11. A method for generating a graphical user interface of an application that is configured to receive annotations to documents, the method comprising:
    displaying a document in a first field of the graphical user interface on a display;
    displaying a tuple in a second field of the graphical user interface, the tuple is an annotation to a portion of the document that is displayed in the first field of the graphical user interface, the tuple is a first word or phrase, a second word or phrase, and a third word or phrase that relates the first word or phrase to the second word or phrase;
    displaying an editing field on the display, the editing field comprises a first text entry field that is configured to receive a replacement for the first word or phrase, a second text entry field that is configured to receive a replacement for the second word or phrase, and a third text entry field that is configured to receive a replacement for the third word or phrase; and
    responsive to a graphical button in the third field of the graphical user interface being depressed, generating a data packet and transmitting the data packet to a data repository by way of a network connection, the data packet has a first format, the data repository comprises other data packets of the first format, and the data packet comprises the tuple and relationship data that indicates that the tuple is the annotation to the portion of the document.

12. The method of claim 11 configured for execution on a mobile telephone.

13. The method of claim 11, the portion of the document is a sentence in the document, the method further comprising highlighting the sentence in the document simultaneously with displaying the tuple in the second field.

14. The method of claim 11, the portion of the document is a sentence in the document, and the first word or phrase is a subject of the sentence, the second word or phrase is an object of the sentence, and the third word or phrase is a predicate that relates the subject of the sentence to the object of the sentence.

15. The method of claim 11, the application is one of a browser or a word processing application.

16. The method of claim 11, further comprising automatically generating the tuple by utilizing natural language processing to identify the first word or phrase, the second word or phrase, and the third word of phrase in the portion of the document.

17. The method of claim 11, further comprising displaying the tuple in the second field responsive to a cursor being placed in the portion of the document displayed in the first field.

18. A computer-readable memory comprising instructions that, when executed by a processor, cause the processor to perform a plurality of acts comprising:
 displaying a document in a first field in a graphical user interface, the document comprises text;
 receiving a selection of a portion of the document from a user in the first field;
 responsive to receiving the selection of the portion of the document from the user in the first field, displaying a tuple in a second field that corresponds to the portion of the document being displayed in the first field, the tuple is an annotation to the portion of the document being displayed in the first field, the tuple has the following format: a subject of a sentence, an object of the sentence, and a predicate that relates the subject to the object;
 displaying an editing field on the display, the editing field comprises a first text entry field that facilitates alteration of the first word or phrase, a second text entry field that facilitates alteration of the second word or phrase, and a third text entry field that facilitates alteration of the third word or phrase;
 replacing at least one of the first word or phrase, the second word or phrase, or the third word or phrase in the tuple based upon input in one of the first text entry field, the second text entry field, or the third text entry field; and
 responsive to receipt of a command from the user, transmitting data to a server computing device that comprises a data repository, the data repository comprises tuples having the format of the tuple, the tuples being annotations to other documents.

19. The computer-readable memory of claim 18, further comprising highlighting the portion of the document to indicate that the tuple has been assigned thereto.

20. The computer-readable memory of claim 18, the graphical user interface being for a word processing application or a browser.

* * * * *